(12) United States Patent  
Hazra et al.

(10) Patent No.: US 12,487,312 B2
(45) Date of Patent: Dec. 2, 2025

(54) DYNAMIC AND INTERMITTENT LOCALIZATION

(71) Applicant: Apple Inc., Cupertino, CA (US)

(72) Inventors: Siddharth S. Hazra, Hayward, CA (US); Brad W. Simeral, San Francisco, CA (US); Oleg Naroditsky, San Francisco, CA (US); Lukas Polok, Cupertino, CA (US); Adam S. Howell, Oakland, CA (US); Mehrad Tavakoli, Poway, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/353,252

(22) Filed: Jul. 17, 2023

(65) Prior Publication Data

US 2024/0019522 A1 Jan. 18, 2024

Related U.S. Application Data

(60) Provisional application No. 63/368,527, filed on Jul. 15, 2022.

(51) Int. Cl.
*G01S 5/00* (2006.01)
*G01S 5/02* (2010.01)
*H04W 64/00* (2009.01)

(52) U.S. Cl.
CPC .......... *G01S 5/019* (2020.05); *G01S 5/02585* (2020.05); *H04W 64/00* (2013.01)

(58) Field of Classification Search
CPC ..... G01S 5/019; G01S 5/02585; H04W 64/00
USPC ....................................... 455/456.1
See application file for complete search history.

(56) References Cited

U.S. PATENT DOCUMENTS

| | | | |
|---|---|---|---|
| 7,392,134 B2 * | 6/2008 | Tauchi | G01S 19/396 340/988 |
| 2021/0385766 A1 * | 12/2021 | Manolakos | H04W 52/0216 |
| 2022/0048135 A1 * | 2/2022 | Brookhyser | B23K 26/0648 |
| 2022/0163679 A1 * | 5/2022 | Muthuraman | H04W 4/024 |

* cited by examiner

*Primary Examiner* — Michael R Neff
(74) *Attorney, Agent, or Firm* — Blank Rome LLP

(57) ABSTRACT

Performing a combination localization technique includes determining a target localization parameter, selecting a combination localization technique in accordance with the target localization parameter, including a first localization technique associated with a first power error time profile, and a second localization technique associated with a second power error time profile. A device location is determined using the first localization technique for a first time period in accordance with the first power error time profile, and an updated device location is determined using the second localization technique in response to a triggering condition. A further updated device location is determined using the first localization technique following the first time period based on the updated device location. At least one of a combined energy value and a combined maximum error rate for the combination localization technique satisfies the target localization parameter.

20 Claims, 9 Drawing Sheets

DYNAMIC AND INTERMITTENT LOCALIZATION

BACKGROUND

This disclosure relates generally to localization techniques. More particularly, but not by way of limitation, this disclosure relates to techniques and systems of performing dynamic and intermittent localization for mobile devices.

Many electronic devices today are mobile devices. It is increasingly helpful to determine location information for these devices. Localization may be performed in a number of ways, such as vision-based localization, inertial localization, WiFi localization, and other methods. However, at the same time, many of these mobile devices are becoming smaller and have limited power to determine location information. In addition, the localization accuracy may vary widely across different localization techniques. Often, low power localization technologies produce low accuracy location estimates, whereas high power localization technologies produce high accuracy location estimates.

DETAILED DESCRIPTION

Figure 1B:
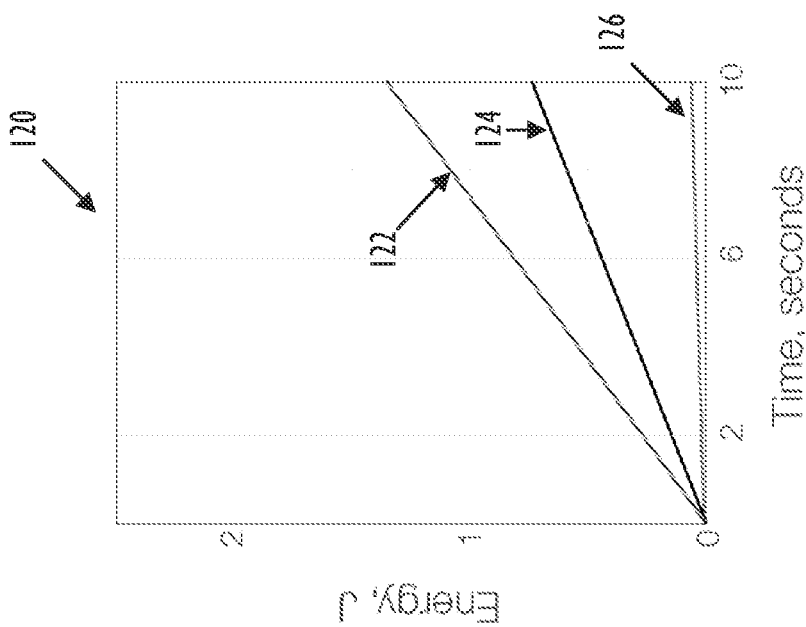
FIGS. 1A-1D show example diagrams of power error time profiles for various localization techniques, according to some embodiments.

This disclosure pertains to systems, methods, and computer readable media for performing localization techniques in a manner to satisfy accuracy and/or power saving needs. In particular, embodiments described herein are directed to a technique for adaptively performing a combination of different localization techniques to achieve a target power and/or error profile.

Some embodiments described herein are determining and performing a localization technique in a manner that includes different localization methods in a phased approach so as to periodically correct accuracy errors that accumulate over time, for example using some low-power approaches. As such, a first localization method associated with lower accuracy (and, thus, perhaps lower power needs) can be performed in a way such that it is periodically interrupted by a second localization method associated with higher accuracy (and, thus, perhaps higher power needs) so that the localization data is occasionally refined. By doing so, the system can perform localization in a manner that satisfies acceptable power consumption and/or acceptable error rates.

According to one or more embodiments, a device may be equipped with one or more sensors or other components by which data may be gathered for localization calculations. A target localization parameter may be obtained. The target localization parameter may indicate, for example, a target error rate, such as an acceptable error rate, a target power cost, such as an acceptable level of power consumption, or the like related to localization data for a mobile device. The target localization parameter may be determined, for example, based on system requirements, application requirements for applications running on the system, user preference, for example based on user profile data or other user input, and the like.

In some embodiments, a combination localization technique is selected to satisfy the target localization parameter. The combination localization technique may include two or more localization techniques. For each localization technique, a period of time is selected for which the localization technique is to be practiced for a particular epoch. The period of time may be based on various considerations that are based on the target localization parameters, such as maximum allowable error rate, maximum allowable power consumption for a particular time period, and the like.

In addition, in some embodiments, startup metrics for some localization techniques are considered in selecting the time periods. The startup metrics may include, for example, an initialization time required for the system to initiate a particular localization technique, such as the time required to start up sensors used to collect data to run the localization technique, initial calculations, and the like. The startup metrics may also include a corresponding initialization power cost. The initialization power cost may include power consumption required by the system related to the initialization of the particular localization technique.

The set of selected localization techniques may be combined in a combined localization technique in a manner such that the target localization parameter is satisfied. The combined localization technique may include a determined time period for each of the selected localization techniques. In addition, the combined localization technique may indicate, during each time period, an initialization time at which initialization of a next localization technique is initialized, for example in embodiments in which one or more localization techniques require initialization. The time at which a next localization technique is initialized is selected such that the total power consumption for the combined localization technique satisfies a target localization metric, according to some embodiments. As such, the combined localization technique includes determining the location of a device using a first localization technique during a first time period. Then, during the first time period at an initialization time for a second localization technique, the second localization technique is initialized such that an accumulated error from the first localization does not exceed a maximum allowed error rate and/or power consumption for a set time. For example, if a first localization technique provides less accuracy and uses less power than a second localization technique, the first localization technique may be used for a first time period. A triggering event occurs during the first time period at which a second localization technique should be initialized such that the device can use the second localization technique before an accumulated error from the first localization technique surpasses an allowed error amount.

According to some embodiments, adaptively performing the combination localization technique improves the performance of the device by allowing the device to achieve an application-defined accuracy for location information while maintaining a system-determined power profile.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system and business-related constraints), and that these goals may vary from one implementation to another. It will also be appreciated that such development efforts might be complex and time-consuming but would nevertheless be a routine undertaking for those of ordinary skill in the design and implementation of video encoding systems having the benefit of this disclosure.

Embodiments described herein are directed to combined localization techniques, in which a mobile device performs localization using a combination of methods that differ in power usage and/or accuracy. Examples of localization techniques include, for example, inertial positioning, such as dead reckoning, using physics models based on gait/stride heuristics and other data, inertial odometry, and the like. Other examples of localization techniques include radio localization, for example using Bluetooth, UWB radio, mmWave radar, WiFi, Indoor Positioning, and the like. Further, satellite radio (e.g., Global Navigation Satellite System) and cellular-base localization may be used (e.g., 4G and 5G positioning). Further, in some embodiments, available localization techniques may include visual technologies, such as visual localization, visual-inertial odometry ("VIO"), simultaneous localization and mapping ("SLAM"), and the like.

Each of these various localization techniques may utilize a particular set of device data which may be collected, for example, by sensors on the device. The particular requirements of a localization technique may result in a power cost, which is the power required by the device to initialize the particular localization technique. In some embodiments, the set of resources required to be initialized to run the localization technique, such as a particular set of sensors or other components, may affect the initialization power cost for a given localization technique. In addition, each of these localization techniques may be associated with a particular power error time profile, which may indicate a power requirement over a particular time period and/or an expected accumulated error over a particular time period. According to some embodiments, the various characteristics for the different localization techniques (e.g., the power error time profile, the initialization power cost, and the like) may be specific to a device.

Figure 1A:
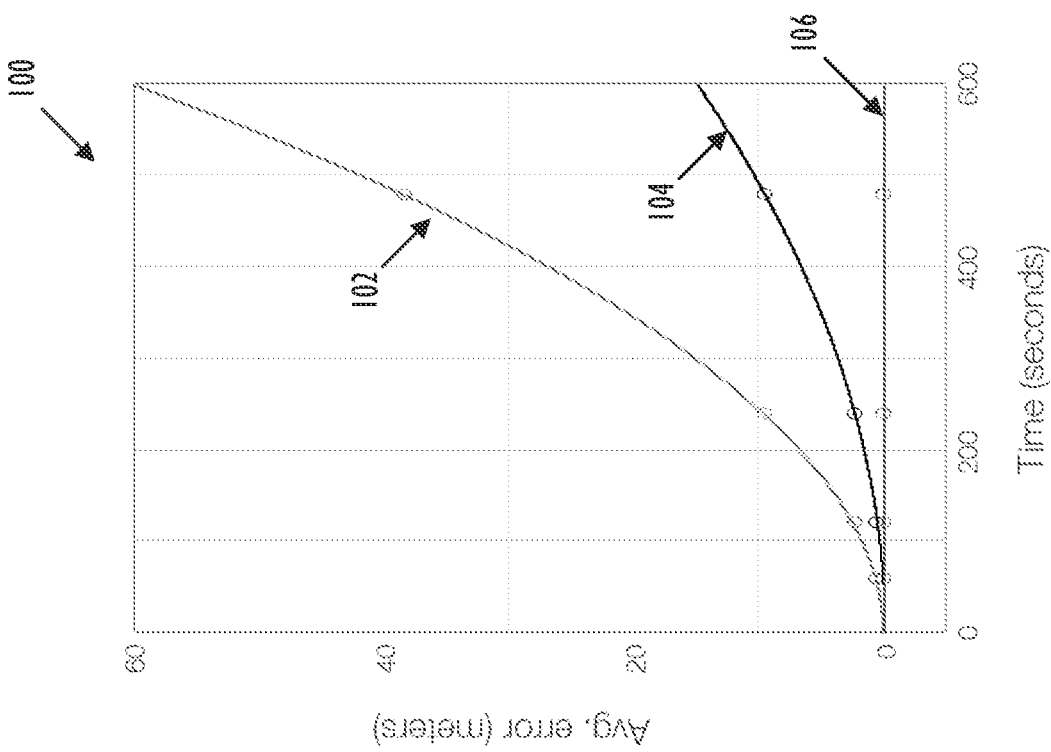

FIG. 1A shows example diagrams of power error time metrics for various localization techniques, according to some embodiments. In particular, FIG. 1A shows a comparative chart 100 of accumulated error over time for three example localization techniques. For purposes of this example, curve 102 may relate to a low accuracy technique, such as inertial positioning. Curve 104 may relate to a mid-range localization technique, such as VIO, and curve 106 may relate to a high accuracy localization technique, such as SLAM. As shown in chart 100, over the course of ten minutes, a device using inertial positioning may accumulate 60 meters of error in determining location of the device, whereas the device performing SLAM localization accumulates almost no error in determining the location of the device. In addition, the VIO technique shows roughly 15 meters of error over ten minutes, which, as shown, is more accurate than inertial positioning over the same amount of time, but less accurate than localization using SLAM. That is, a localization technique that results in greater accumulated error over the same amount of time as other localization techniques is considered less accurate than the other localization techniques.

Turning to FIG. 1B, an example diagram is shown depicting a comparative chart 120 of energy consumption by a device running the different localization techniques. For the purposes of explanation, the same three techniques described above with respect to FIG. 1A will again be used in the example. In comparative chart 120, a first line 126 represents the energy consumption of a device running an inertial positioning localization technique. As shown, over the course of 10 seconds, the inertial positioning localization technique requires very little energy. By contrast, the third line 122 represents the energy required by the device to perform localization using SLAM. Notably, while performing inertial positioning using inertial positioning leads to the greatest accumulated error, it also results in the least energy usage. By contrast, performing localization using SLAM results in very little accumulated error, it requires the greatest amount of energy of the three example localization techniques. Here, again, the VIO localization technique provides a mid-range energy solution among the three example techniques, requiring more energy than inertial positioning, but less energy than SLAM.

Figure 1C:
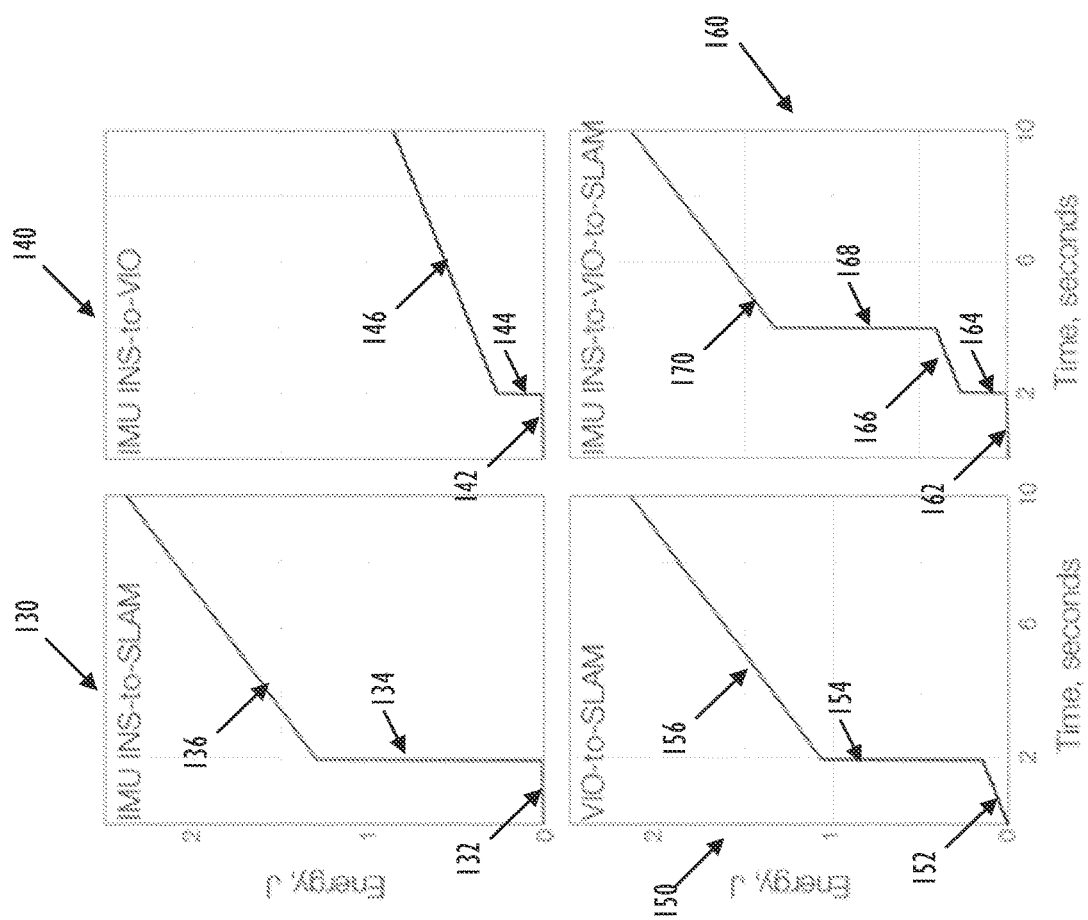

Another component of a power error time profile includes an initialization power cost for a particular technique. Turning to FIG. 1C, a set of charts are depicted indicating various energy profiles from transitioning between different localization techniques. Because initialization represents overhead energy costs that are incurrent when turning on localization technologies, initialization costs may vary depending on a current state of a device. Similarly, the time required for initialization of a particular localization technique may also vary based on the current state of the device.

Inertial positioning to SLAM chart 130 shows energy usage by a device which uses a combined localization technique that includes an inertial positioning phase followed by SLAM over a selected time period of 10 seconds. As shown, almost no energy is used during the initial 2 second period 132 when inertial positioning is in use, and then a large increase when SLAM is initialized at 134, followed by an 8 second period of energy use at a greater rate using SLAM at 136. The large jump in energy use during initialization may be based on turning on system resources required to run SLAM which are not already running. These startup costs for system resources may include, for example, turning cameras on which may not have been in use during the period when inertial positioning was used (for example, because inertial positioning does not use the cameras and other resources required to use SLAM). As such, the overall energy use for the time period is roughly 2.2 J.

Inertial positioning to VIO chart 140 shows energy use by a device which uses a combined localization technique that includes an inertial positioning phase followed by a VIO phase over a selected time period of 10 seconds. As shown, almost no energy use during an initial two second period of initialization time 142 when inertial positioning is in use, and then a moderate increase when VIO is initialized at 144, followed by an 8 second time period of energy use at a greater rate using VIO at 146. The jump in energy use during initialization may be based on turning on system resources required to run VIO which are not already running. These startup costs for system resources may include, for example, turning cameras on which may not have been in use during the period when inertial positioning was used (for example, because inertial positioning does not use the cameras, and also no other application is currently using the cameras), but requires less energy to transition than when transitioning to SLAM. In addition, once initialized, VIO uses less energy than SLAM. As such, the overall energy use for the time period is roughly 0.7 J.

A different profile is apparent in VIO to SLAM chart 150, which shows energy use by a device which uses a combined localization technique that includes a VIO phase followed by a SLAM phase over a selected time period of 10 seconds. As shown, a moderate amount of energy use during an initial 2 second time period 152 when VIO is in use, and then a moderate increase when SLAM is initialized at 154, followed by an 8 second period of energy use at a greater rate using SLAM at 156. The jump in energy use during initialization may be based on turning on system resources required to run SLAM which are not already running. These startup costs for system resources may include, for example, acquiring initial startup frames, extracting descriptors, matching descriptors, and the like. Once initialized, again as shown in inertial positioning to SLAM chart 130, the device uses energy at a rapid rate, as shown at 156. As such, the overall energy use for the time period is roughly 2 J.

Notably, a combination localization technique that includes individual localization types that generally require less power in total when considered separately, may not require less power when considered in combination. As an example, inertial to SLAM chart 130 depicts a combination low power technique (inertial localization) and high-power technique (SLAM), with a total energy cost of 2.2 J over 10 seconds. By contrast, VIO to SLAM chart 150 depicts a combination moderate power technique (VIO localization) and high-power technique (SLAM), with a total energy cost of 2 J over 10 seconds. That is, although the inertial localization and SLAM individually require less power than VIO and SLAM, the initialization cost required for the transition (e.g., 134 and 154) causes the combination of VIO to SLAM to actually be more power efficient over time. However, it should be understood that the outcome would differ if the duration of the first phase using a lower energy rate were longer and the second phase using a higher energy rate were shorter.

In some embodiments, a combination localization technique can include more than two localization types, as shown in inertial positioning to VIO to SLAM chart 160. Inertial positioning to VIO to SLAM chart 160 shows energy use by a device which uses a combined localization technique that includes a 2 second inertial positioning phase, followed by a 2 second VIO phase, followed by a 6 second SLAM phase over a selected time period of 10 seconds. As shown, almost no energy use during an initial period 162 when inertial positioning is in use, and then a moderate increase when VIO is initialized at 164, followed by a period of energy use at a moderate rate using VIO at 166. Then a second transition is introduced at 168 where SLAM is initialized, followed by the use of SLAM localization at 170. As shown, the total energy use of a combined localization technique that includes inertial localization, VIO, and SLAM, in this configuration, is roughly the same as the VIO to SLAM combination depicted in chart 150. Notably, the inertial localization, VIO, and SLAM, as configured in this example, also requires less energy than the inertial positioning to SLAM combination technique depicted in chart 130. Again, it should be understood that the total energy use of a given combination localization technique will vary based on a time period for each of the individual localization techniques, an order of the individual localization techniques, system state information, and the like.

Figure 1D:
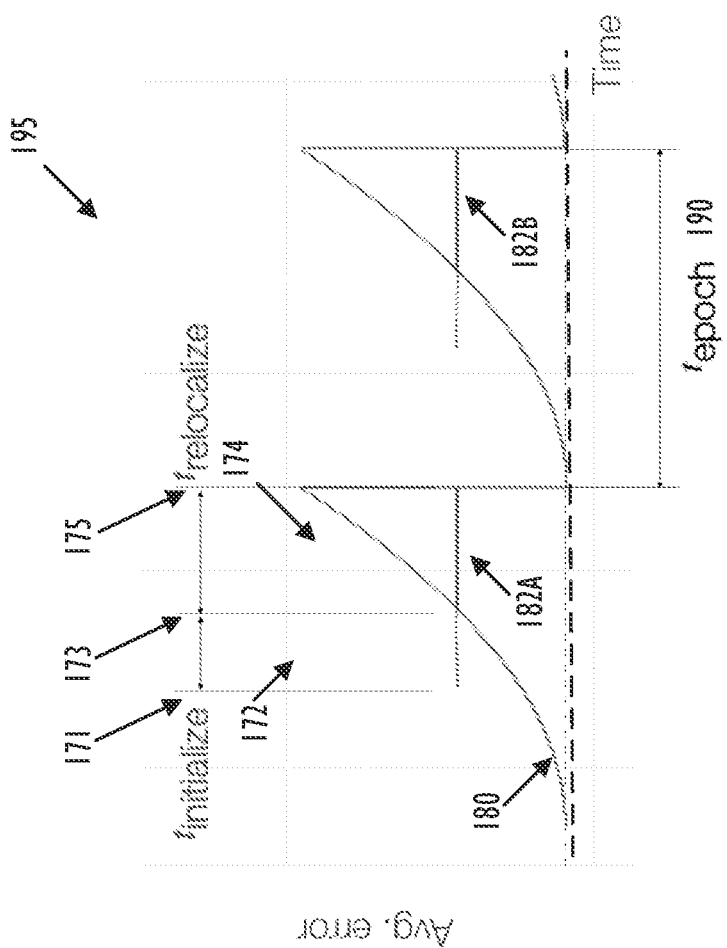

A particular combination localization technique may be selected to address energy needs and, in some embodiments, accuracy needs. For example, a target localization metric may be determined which indicates a maximum allowable error and/or energy use over a particular time period. In addition, the combination of localization types may be configured in a phased manner so that, during localization using a first technique, a second localization technique is initialized. Turning to FIG. 1D, a time error chart 170 is presented depicting an example accumulated error when using a combination localization technique that includes the use of two localization types with different power error time profiles. That is, the different localization techniques are associated with particular power metrics and/or error metrics over a period of time. For example, a first localization technique (e.g., curve 180) may have a lower energy profile and/or lower accuracy profile than a second localization technique (e.g., curves 182A and 182B). For purposes of the example presented, an inertial positioning technique may be used for the first localization technique as represented by curve 180 and a SLAM technique may be used for the second localization technique as shown by features 182A and 182B. A combination technique may additionally be defined by a configuration of the series of localization techniques, such as the ordering of the localization techniques, triggering events causing different techniques to be initialized and/or deployed, and the like. As such, a combination localization technique may have a particular combined maximum energy value and/or a combined maximum error rate based on the power error time metrics for the configuration of localization techniques in the combination localization technique.

In some embodiments, the combination localization technique provides a periodic solution, where one period is defined as an epoch, such as epoch 190 of FIG. 1D. Initially, the inertial localization technique is used, as shown by curve

180. An initialization time for SLAM may be determined during the first time period at time 171. An elapsed time during the first phase may indicate a triggering condition which causes the SLAM technique to be initialized. Initialization may include, for example, the time and energy required to turn on services and resources to enable relocalization using SLAM. Then, at 172, the SLAM technique is initialized while the inertial position technique continues to provide location information. At 173, the SLAM technique performs relocalization as shown at 174. Relocalization may include, for example, acquiring initialization frames from one or more system cameras, extracting feature descriptors, performing feature matching, determining camera pose, and providing the information to a SLAM mapping API which may return location information, such as a device pose.

Upon determining a device pose at 175, then the updated pose location is used to revise the localization performance using the first localization technique. For example, in some embodiments, pose information determined by the SLAM process may be fused to the inertial positioning-determined pose such that the accumulated error caused by the inertial positioning localization is reduced. In some embodiments, the fusion of the location information may involve a joint error minimization math scheme. Upon revising the localization performance, the combined localization technique proceeds with a next epoch 190 and the process begins again. In some embodiments, resources and services used for SLAM that are no longer needed may be turned off until a triggering condition for initialization is again satisfied. Thus, in the first epoch, SLAM is initialized and running during time period 182A and during the second epoch 190 during time period 182B.

As described above, a particular combination localization technique may include various configuration parameters, including the individual localization techniques used, their ordering, triggering events to transition from one localization technique to another, timing requirements, and the like. These various configuration parameters may be selected based on the power error time profiles of the localization techniques, individually and in combination, to satisfy a target localization parameter, such as an allowable accumulated error and/or an allowable power usage over a particular time.

Figure 2:
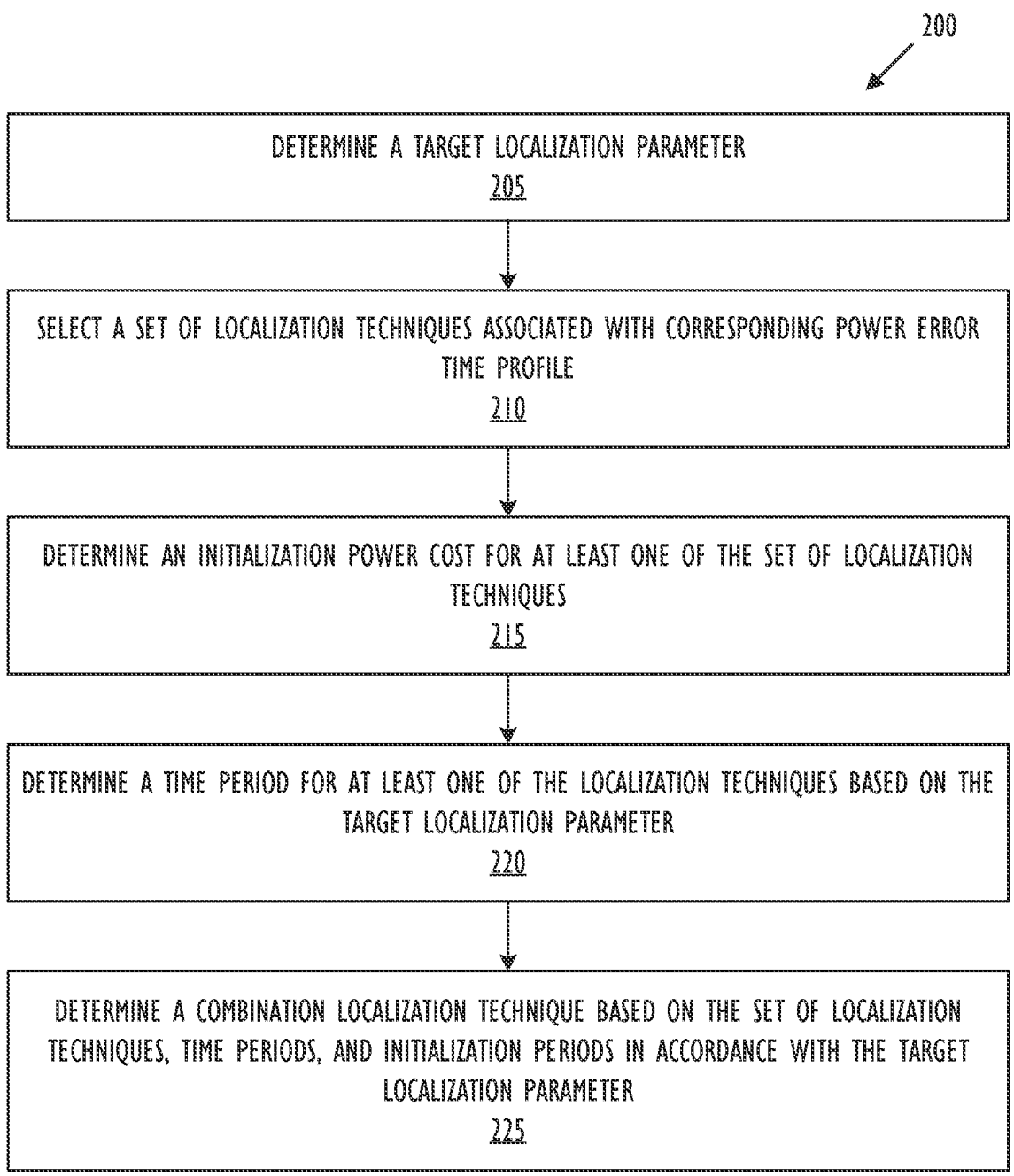
FIG. 2 shows, in flow chart form, an example process for determining a combination localization technique, according to some embodiments.

FIG. 2 shows, in flow chart form, an example process for determining a combination localization technique, according to some embodiments. For purposes of explanation, the following steps are described as being performed by particular components. However, it should be understood that the various actions may be performed by alternate components. In addition, the various actions may be performed in a different order. Further, some actions may be performed simultaneously, and some may not be required, or others may be added.

The flowchart 200 begins at block 205, where a target localization parameter is determined. According to some embodiments, the target localization parameter may be related to a target energy use, a target accuracy, or the like. In some embodiments, the target localization parameter may be based on a particular time period, such as an epoch, for example a duration of a cycle. As such, the localization may be performed using a cyclical approach. The target localization parameter may be predetermined, based on system requirements, application requirements, or the like. Further, in some embodiments, the target localization parameter may be user-specified, application-specified, and may be modified dynamically, for example based on application and/or system conditions.

The flowchart continues at block 210, where a set of localization techniques is selected. Each of the selected localization techniques is associated with a corresponding power error time profile. The set of localization techniques may be a set of techniques selected to be part of a combination localization technique or may be candidate techniques for a combination localization technique. The power error time profile may specify, for a particular localization technique, parameters related to power usage required to run the localization technique, a rate of accumulated error, one or more initialization power costs for the localization technique, and the like. In some embodiments, the power error time profiles may be stored in a lookup table on a local device, and may be device specific, for example depending on system resources, application use of commonly required resources required for the localization technique, and the like. According to one or more embodiments, the power error time profile may indicate parameters related to power usage based on other factors such as availability, prior performance, and apriori knowledge of approximate locations. For example, the availability of some system resources required for a particular localization technique may affect a power error time profile for that localization technique, such as a lack of GPS indoors, or a lack of an environment map for a SLAM localization technique. As another example, the power error time profile may take into consideration prior performance, for example of a particular localization technique generally, or in a particular context (e.g., a determination that a GPS localization technique has poor performance in locations with dense skyscrapers). As yet another example, apriori knowledge of a location may be considered in the power error time profile (e.g., having a known seed location of a user, determining available localization techniques available for the seed location and/or pre-enrolled maps of the location).

At block 215, an initialization power cost is determined for at least one of the sets of localization techniques. In some embodiments, the initialization cost determined may be based on current system resources available. Further, in some embodiments, an initialization cost may be determined for a selected sequence of localization techniques for a combination localization technique. Additionally, or alternatively, other candidate localization costs may be determined for one or more localization techniques based on candidate sequences, or other candidate configurations. For example, as described above with respect to FIG. 1C, with respect to chart 130 and chart 150, a SLAM localization technique is associated with a different initialization cost when SLAM follows an inertial positioning technique as compared to a VIO technique (e.g., comparing initialization cost 134 to initialization cost 154). As described above, this may be because certain resources, such as cameras, do not need to be initialized because they are already in use for the VIO technique.

The flowchart 200 continues at block 220 where a time period is determined for at least one of the localization techniques based on the target localization parameter. The time period may be determined, for example, based on the sequence of localization techniques used in the combination localization technique, a configuration of localization techniques and the like. For example, as shown in FIG. 1D above, in some embodiments, a time period for a first localization technique, such as the inertial position localization technique may span the entire epoch, whereas the SLAM localization technique overlaps the inertial positioning localization technique and is active during a shorter time span, which includes an initialization time 142 and a relocalization time 144. Alternatively, as will be described below, some configurations of combination localization techniques may include some localization techniques performed in sequence, such as no single localization technique spanning an entire epoch.

At block 225, the combination localization technique is determined based on the set of localization techniques, time periods, and initialization periods, in accordance with the target localization parameter. The combination localization technique may include a set of localization techniques in a particular configuration so as to satisfy requirements of the target localization parameter. For example, the configuration may be selected so as to switch from a low power, low accuracy mode to a high power, high accuracy mode periodically (e.g., each epoch) such that the low power, low accuracy mode resets based on location information determined by the high power high accuracy mode in order to avoid exceeding a maximum allowed error. In addition, the combination localization technique may be configured so that the high power, high accuracy mode may only run for a limited time period such that the total energy use of the combination localization technique does not exceed a maximum allowed power requirement. In addition, the particular configuration for a combination localization technique may include triggering conditions from transitioning from one localization technique to another, such as timing, performance of the device, a particular state of the device (e.g., resources required for a particular localization technique are initialized), and the like.

In some embodiments, a candidate combination localization technique may be selected from a set of candidate combination localization techniques that satisfy the target localization parameters. For example, the system may identify two or more candidate localization techniques that have different configurations and/or different combinations of localization techniques. In some embodiments, secondary considerations may be used to select a particular combination localization technique, such as preferred energy efficiency, preferred accuracy, user preference, application preference, and the like.

Figure 3:
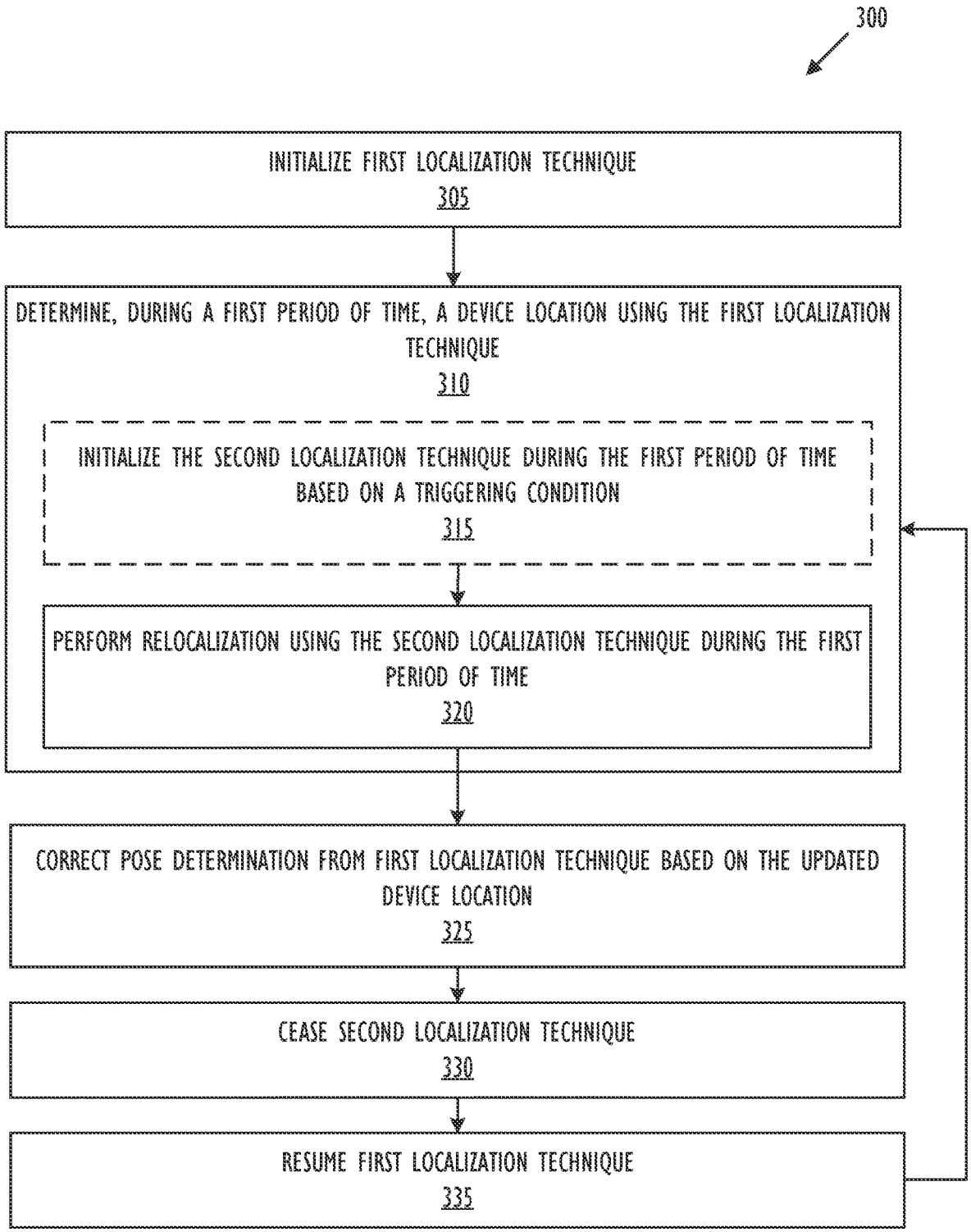
FIG. 3 shows, in flow chart form, an example process for performing a combination localization technique, according to some embodiments.

FIG. 3 shows, in flow chart form, an example process for performing a combination localization technique, according to some embodiments. Specifically, FIG. 3 describes using a combination localization technique over an epoch that includes two different localization techniques. It should be understood that the flowchart 300 depicts one example configuration of a combination localization technique and is not intended to limit other potential configurations for combination localization techniques. For purposes of explanation, the following steps are described as being performed by particular components; however, it should be understood that the various actions may be performed by alternate components. In addition, the various actions may be performed in a different order. Further, some actions may be performed simultaneously, and some may not be required, or others may be added.

Flowchart 300 starts at block 305 where a first localization technique is initialized. In some embodiments, the first localization technique may be a lower power, less accurate localization technique than a second localization technique used in the combination localization technique. The first localization technique may be initialized to begin calculating location information for the system, and may include, for example, turning on services and resources required to use the first localization technique, such as sensors and the like.

The flowchart continues at block 310 where, during a first period of time, a device location is determined using the first localization technique. For example, referring back to FIG. 1D, the first technique 180 is performed over a particular time. In FIG. 1D, the first time period includes the entire epoch, although in other embodiments, as will be described below, the first localization technique may be performed for only a portion of the epoch.

According to some embodiments, during the time period while the device is calculating location information using the first localization technique, the combination localization technique specifies that a second localization technique should be used to perform relocalization, or to otherwise determine location information. As such, flowchart includes, at 315, initializing the second localization technique during the first period of time based on a triggering condition. The initialization of the second localization technique may be triggered based on a particular timing, such as after a period of elapsed time during the first time period, a period of elapsed time during the epoch, and the like. The initialization of the second localization technique may include powering up, turning on, or otherwise initializing system resources and services required for using the second localization technique that are not otherwise already initialized. For example, if GPS is used as the second localization technique, TPS services must be activated, a GPS chipset may need to be activated, the system may need to begin searching for satellites, selecting a constellation to use, identifying a band to use, and the like. As shown, initialization of the second localization technique is depicted as an optional step because, in some embodiments, a state of the device and the requirements of the second localization technique may cause the second localization technique to already be initialized, for example if the sensors and other services are already on.

The flowchart 300 continues at block 320 where relocalization is performed using the second localization technique during the first period of time. That is, at block 320, location information is being calculated by the first localization technique and the second localization technique in parallel, for example because the second localization technique is being used to perform relocalization. Further, in some embodiments, the first localization technique and the second localization technique may be performed concurrently if one of the localization techniques is configured to continuously calculate location data. In some embodiments, it may be desirable to configure one or more localization techniques in the combination localization technique to perform in an always-on configuration to avoid overhead costs associated with initialization of the localization technique. As another example, it may be desirable to configure one or more localization techniques in the combination localization technique to perform in an always-on configuration to provide a backup technique in case the second localization technique fails.

The flowchart proceeds to block 325 where a pose determination from the first localization technique is corrected in accordance with the relocalization from the second localization technique as determined at block 320. In some embodiments, the relocalization performed at block 320 may provide an absolute pose, such as location information for the device in the current coordinate system. This absolute pose may be fused with the current pose as determined by the first localization technique such that the accumulated error currently acquired by the first localization technique is reduced or removed based on the location information determined from the second localization technique. In some embodiments, the fusion occurs by applying a joint error minimization math scheme to the localization results from the two localization techniques to provide, to the first localization technique, new current location information to use for ongoing localization calculations. For example, techniques such as IMU-based methods may use a current location estimate for fusion with the location information from the second technique. However, in some embodiments, the updated location information may simply be passed to the first location technique for further processing.

Once the relocalization by the second localization technique is successful, the second localization technique may cease performance in some embodiments. Accordingly, block 330 shows that the system ceases use of the second localization technique. It should be understood that although the flowchart 300 depicts the second location technique ending after the pose determination for the first localization technique is corrected, in some embodiments, the second localization technique may cease as soon as location information is successfully determined using the second localization technique or at another time in the flowchart. As such, the second localization technique may be performed in an intermittent manner. Further, in some embodiments, the second localization technique may be performed in an "always-on" manner and may continue processing.

The flowchart 300 concludes at block 335 where the first localization technique resumes using the corrected pose determination determined at block 325. In some embodiments, correcting the pose determination for the first localization technique may begin a new epoch, and the flowchart returns to block 310 where, during a new time period, the device location is determined. Again, upon a triggering condition, the second localization technique may be initiated and performed such that a maximum allowed error and/or energy use are not exceeded.

Figure 4:
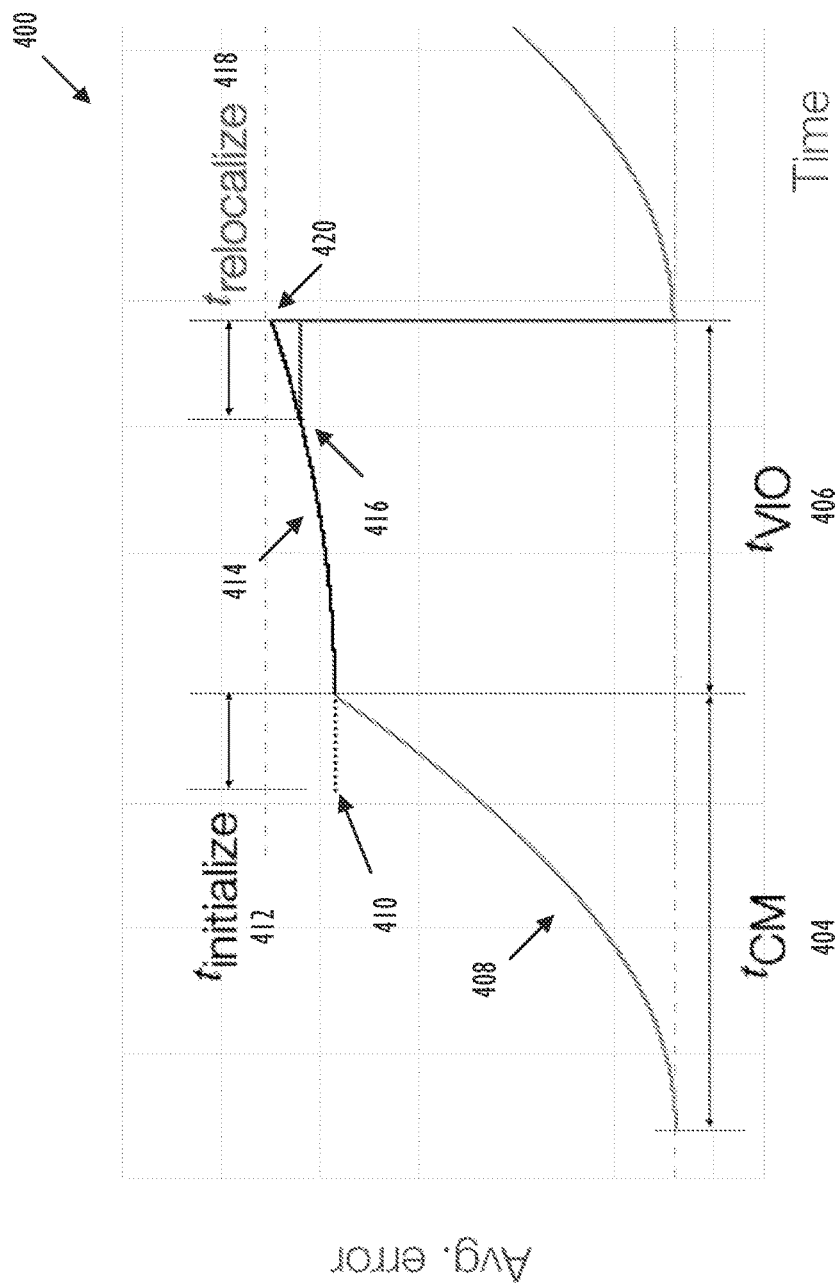
FIG. 4 shows, in flow chart form, an example process for adjusting a combination localization technique, according to some embodiments.

Although techniques described above include two localization techniques utilized during an epoch, it should be understood that additional localization techniques may be used within an epoch to satisfy target localization parameters. FIG. 4 depicts an example diagram of a combination localization technique that uses three unique localization techniques.

The diagram 400 shows an average error over time for a combined localization technique that uses, during a given epoch, an IMU-based technique during a first time $t_{CM}$ 404, and a VIO localization technique during a second time $t_{VIO}$ 406. In addition, a third relocalization technique, such as SLAM is used.

As shown during $t_{CM}$ 404, a first localization technique is used for which a first accumulated error 408 increases at a first rate over the time period. At a first point in time (410), the VIO localization technique is initialized. As described above, initializing VIO may include turning on cameras and the like. In some embodiments, VIO takes some time to initialize, as shown by $t_{initialize}$ 412. The initialization occurs during $t_{CM}$ such that the system can begin using the VIO technique during $t_{VIO}$ 406. As shown, the accumulated error of the VIO localization technique 414 accumulates at a slower rate than the IMU-based technique during $t_{CM}$ 404.

At some point in time 416, the third localization technique begins, such as SLAM. Because SLAM uses many of the same components as VIO localization and can use data collected during VIO localization to perform SLAM relocalization (such as image frames collected for VIO localization), then at 416 SLAM may initiate without any further initialization. During $t_{relocalize}$ SLAM relocalization is performed concurrently with the VIO technique such that the system can continue to use location information provided by VIO while the SLAM process attempts to determine absolute location information. Then, when relocalization using SLAM is complete at time 420, the SLAM-determined pose information may be fused with the VIO-determined location information to calculate updated current location information and a new epoch may begin, where the IMU-based technique runs using the calculated updated current location information. Notably, because VIO and IMU localization techniques use many of the same components, the IMU technique does not require an initialization period. As such, the device resources common to the IMU-based and VIO localization techniques run in an always-on mode during the combination relocalization technique, whereas resources that are needed by VIO and SLAM but not the IMU-based technique are initialized each epoch during $t_{initialize}$, in the example embodiment.

Figure 5:
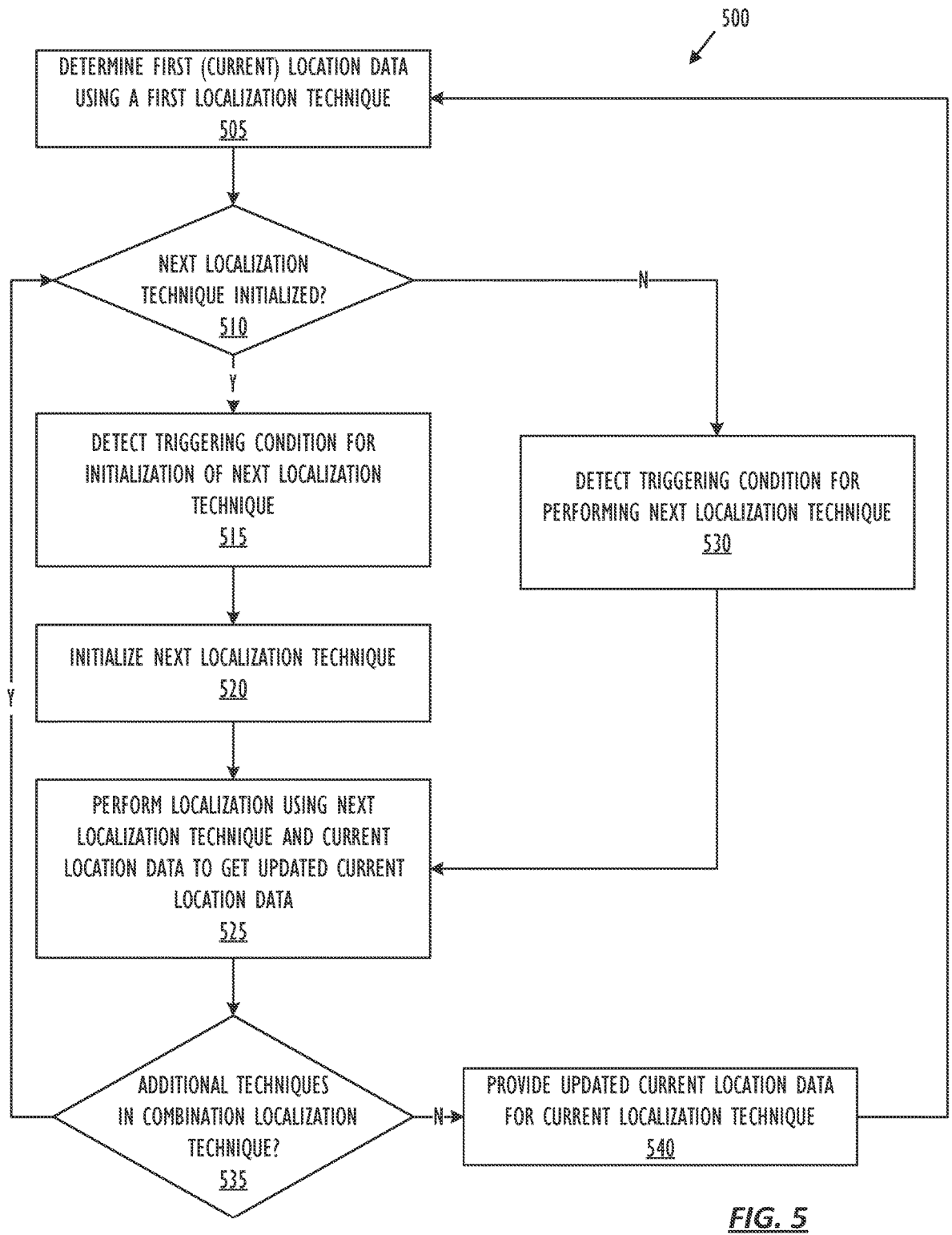
FIG. 5 shows an example diagram of power error time profiles for a combination localization technique, according to some embodiments.

FIG. 5 shows, in flow chart form, an example process for performing a combination localization technique having multiple unique localization techniques, according to some embodiments. Specifically, FIG. 5 describes using a combination localization technique over an epoch that includes more than two different localization techniques. It should be understood that the flowchart 500 depicts one example configuration of a combination localization technique and is not intended to limit other potential configurations for combination localization techniques. For purposes of explanation, the following steps are described as being performed by particular components; however, it should be understood that the various actions may be performed by alternate components. In addition, the various actions may be performed in a different order. Further, some actions may be performed simultaneously, and some may not be required, or others may be added.

The flowchart begins at block 505 where, during a first period of time, a device location is determined using the first localization technique. For example, referring back to FIG. 4, the first technique is performed over a first time, such as $t_{CM}$ 404. In contrast to FIG. 1D, the first time period does not span the entire epoch. Rather, the first time period during which the IMU-based localization technique is performed only spans a portion of the epoch.

The flowchart 500 continues to block 510 where a determination is made regarding whether a next localization technique is initialized. The localization technique may need to be initialized, for example, if the resources required to run the next localization technique are not already active. As an example, the next localization technique may need to be initialized if the next localization technique requires resource that are not already active or otherwise in use by the current localization technique and/or other applications on the device. In some embodiments, the determination may be an active process performed by the device. Alternatively, the device may simply proceed to one of the branches of the decision depending on a predetermined configuration of the combination localization technique.

If at block 510 the next localization technique requires initialization, then the flowchart 500 continues to block 515 until the trigger condition for the next initialization technique is detected. For example, the trigger may be determined based on a timing or other characteristic during the performance of the first localization technique. The initialization of the next localization technique may be triggered based on a particular timing, such as after a period of elapsed time of the first time period, a period of elapsed time during the epoch, and the like. The initialization of the next localization technique is performed at 520 and may include powering up, turning on, or otherwise initializing system resources and services required for using the second localization technique which are not otherwise already initialized. Referring back to FIG. 4, the next localization technique may be initialized at 410 such that the next localization technique can begin in time to avoid exceeding either a maximum allowed accumulated error over an epoch, a maximum energy use, or the like. As such, the flowchart proceeds to 525 and the next localization technique is used to determine current location data.

Similarly, returning to block 510, if the next localization technique does not require initialization then the flowchart continues to block 530 and the trigger condition for performing the next localization technique is detected. The triggering condition may be based on a particular timing, such as a completion of the first time period, a period of elapsed time during the epoch, and the like. Then, the flowchart proceeds to 525 and the next localization technique is used to determine location data and current location data. In some embodiments, at block 525, the next localization technique can build on location information provided by the first localization technique. For example, the first localization technique can pass location information to the second localization technique. In some embodiments, an error minimization technique may be provided to limit or reduce an accumulated error based on the two localization techniques.

The flowchart continues at block 535, and a determination is made whether additional techniques are provided in the combined localization technique. In some embodiments, the determination may be an active process performed by the device. Alternatively, the device may simply proceed to one of the branches of the decision depending on a predetermined configuration of the combination localization technique. If no additional localization techniques are included in the combination localization technique, then the flowchart 500 proceeds to 510 and the flowchart proceeds with a next localization technique in the combination localization technique.

Returning to block 535, if there are additional techniques included in the combination localization technique, then the flowchart continues to 540 and the current localization technique provides the updated current location data for the current localization technique, and the flowchart returns to 505 where localization information is determined using the first localization technique in the combination localization technique. Further, in some embodiments, using the first localization technique in the combination localization technique indicates that a new epoch has begun.

In some embodiments, an error reduction process may be performed prior to using the first localization technique. For example, the first localization technique may use the updated current location data from block 540 to initiate the localization technique. Alternatively, if multiple localization techniques are concurrently running, such has during $t_{relocalize}$ 418 of FIG. 4, then an updated device pose or other location information may be determined, for example, using a pose correction procedure. For example, a currently determined pose from one localization technique may be fused with the current pose as determined by another localization technique running concurrently such that the first localization technique can begin with reduced accumulated error. In some embodiments, the fusion occurs by applying a joint error minimization math scheme to the localization results from the two localization techniques to provide, to the first localization technique, a new current location information to use for ongoing localization calculations.

Figure 6:
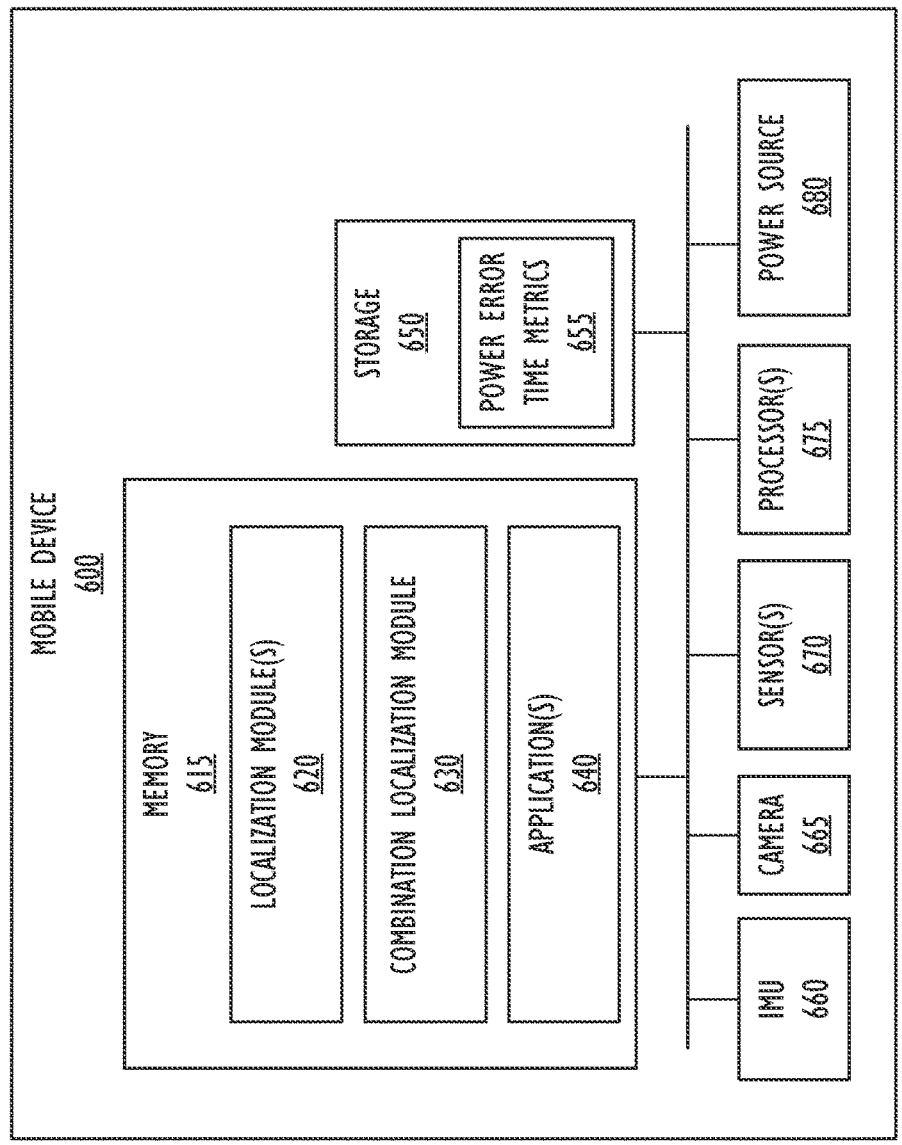
FIG. 6 shows, in block diagram form, exemplary systems for encoding extended reality video streams.

Referring to FIG. 6, a simplified block diagram of a mobile device 600 is depicted, in accordance with one or more embodiments of the disclosure. Mobile device 600 may be a multifunctional electronic device, such as a mobile phone, tablet computer, personal digital assistant, portable music/video player, wearable device, head-mounted systems, projection-based systems, base station, laptop computer, desktop computer, network device, or any other electronic systems such as those described herein. It should be understood that the various components and functionality within mobile device 600 may be differently distributed across the device or may be distributed across additional devices.

Mobile device 600 may include one or more processors 675, such as a central processing unit (CPU). Processor(s) 675 may include a system-on-chip such as those found in mobile devices and include one or more dedicated graphics processing units (GPUs). Further, processor(s) 675 may include multiple processors of the same or different type. Electronic device 600 may also include a memory 615. Memory 615 may include one or more different types of memory, which may be used for performing device functions in conjunction with processor(s) 675. For example, memory 615 may include cache, ROM, RAM, or any kind of transitory or non-transitory computer readable storage medium capable of storing computer readable code. Memory 615 may store various programming modules for execution by processor(s) 675. These programming modules may include, for example, localization modules 620. Localization modules 620 may include computer code for various individual localization techniques to determine location information in association with other system resources, such as various sensors and the like. The various localization techniques may include, for example, cellular localization, such as through 4G and 5G networks, LTE networks, and the like; Satellite radio localization, comms radio localization, such as Bluetooth positioning, WiFi, indoor positioning, microlocation, and the like; IMU-based localization such as inertial positioning, visual localization such as VIO, SLAM, visual beacons, and the like. The memory 615 may also include a combination localization module 630 which may be used to configure and/or deploy combination localization techniques using multiple individual localization techniques for the localization modules 620 in a manner that satisfies a given or determined localization parameter, for example based on a maximum allowable power or accumulated error. The localization parameter may be based on system resources specific to the mobile device 600, and/or may be driven by one or more application(s) 640 running on the mobile device.

Mobile device 600 may also include storage 650. Storage 650 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 65- may be configured to store power error time metrics 655, according to one or more embodiments. The power error time metrics 655 may include data regarding power usage and/or accumulated error over time for various localization techniques and/or combinations of localization techniques when multiple localization techniques run concurrently. Further, in some embodiments, the power error time metrics may include initialization data, such as a time and/or power required for initialization for the various localization techniques and/or combinations of localization techniques, such as a time and/or power required to initialize a given localization technique based on other localization techniques currently running and/or currently running system resources. As an example, initialization requirements for SLAM will be different depending on whether a camera is already running or not, either because of other localization techniques, such as SLAM, or due to other applications on the device, such as image capture applications. Similarly, an amount of energy required to initialize and/or perform a particular localization technique may differ based on a state of the device. The energy may be determined, for example, based on a power cost to a power source 680 of the mobile device 600 attributed to the localization technique. In some embodiments, the power error time metrics 655 may be stored in lookup table or in another data structure stored in storage 650.

Mobile device 600 may also include one or more IMUs 660, cameras 665 and/or other sensors 670, such as a depth sensor, from which location information for the device 600 may be determined. In one or more embodiments, each of the one or more cameras 665 may be a traditional RGB camera, or a depth camera. Further, cameras 665 may include a stereo- or other multi-camera system, a time-of-flight camera system, or the like.

Figure 7:
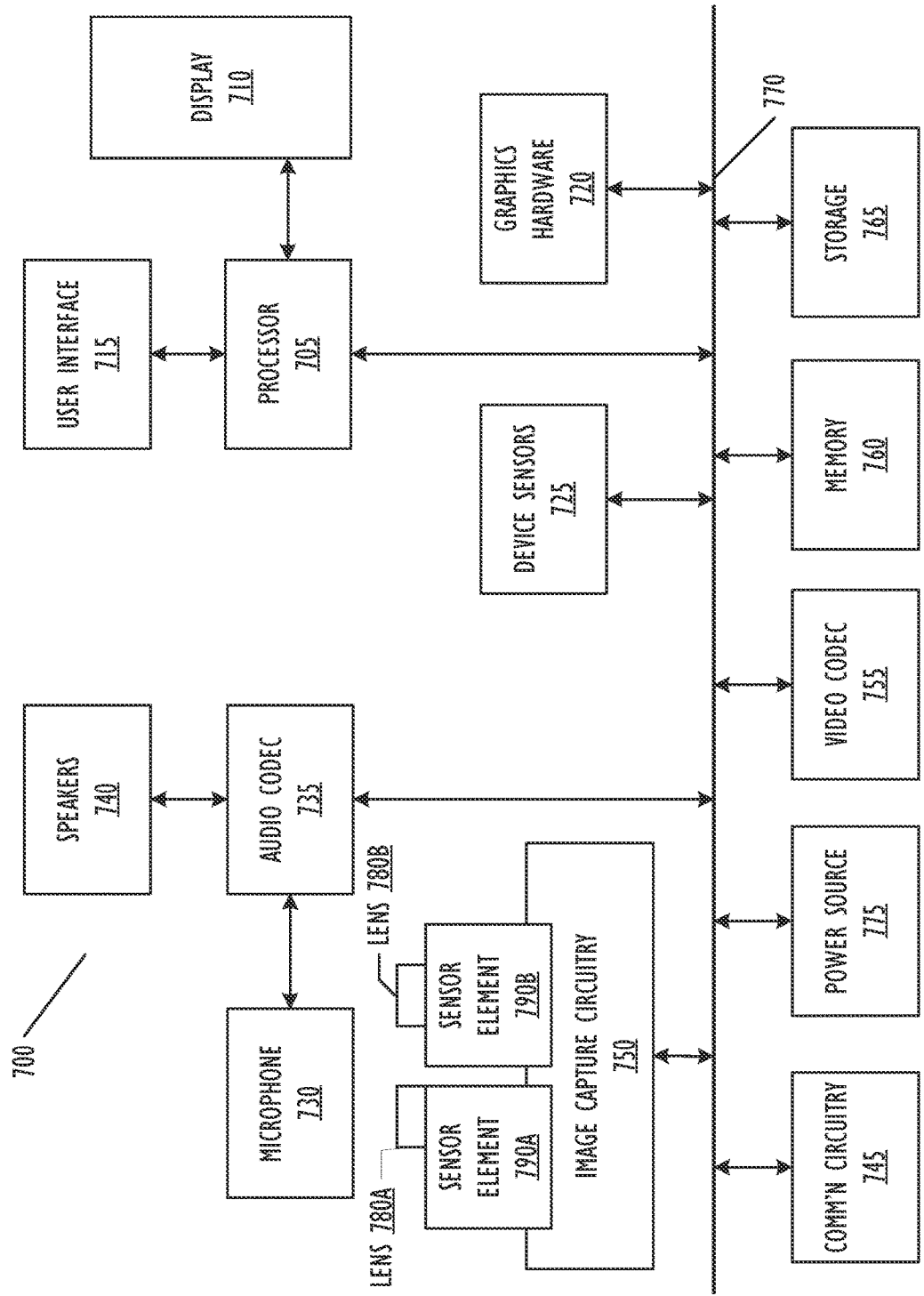
FIG. 7 show an example mobile device in which some embodiments described herein may be practiced.

Referring now to FIG. 7, a simplified functional block diagram of illustrative multifunction electronic device 700 is shown according to one embodiment. Each of the electronic devices may be a multifunctional electronic device or may have some or all of the described components of a multifunctional electronic device described herein. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system) video codec(s) 755 (e.g., in support of digital image capture unit), memory 760, storage device 765, communications bus 770, and power source 775. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 750. Images so captured may be stored in memory 760 and/or storage 765.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random-access memory (RAM). Storage 765 may store media (e.g., audio, image and video files), computer program instructions or software, preference information, device profile information, and any other suitable data. Storage 765 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3 and 5 or the arrangement of elements shown in FIGS. 1, 2, 4, 6 and 7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
  determining a target localization parameter based on an operation of a device;
  selecting a combination localization technique based on the target localization parameter, the combination localization technique comprising a first localization technique having a first power error time profile, and a second localization technique having a second power error time profile;

performing the combination localization technique using a cyclical approach to determine a location of the device, each cycle comprising:

determining, by the device, a first device location using the first localization technique for a first portion of a time period in accordance with the first power error time profile; and determining, by the device, a second device location using the second localization technique for a second portion of the time period in accordance with the second power error time profile.

2. The method of claim 1, wherein the first localization technique comprises a lower power intensive technique and provides a lower accuracy determination than the second localization technique over a particular time period.

3. The method of claim 1, wherein the target localization parameter comprises at least one selected from a group consisting of a target power cost and a target error rate for a predetermined time period.

4. The method of claim 1, further comprising:

initiating, in accordance with a triggering condition, the second localization technique; and in accordance with determining, by the device, an updated device location using the second localization technique, determining a further updated device location using the first localization technique during an additional time period following the time period based on the updated device location, wherein:

the combination localization technique is associated with a combined maximum energy value and a combined maximum error rate based on the first power error time profile and the second power error time profile, and at least one of the combined maximum energy value and the combined maximum error rate satisfies the target localization parameter.

5. The method of claim 4, wherein determining the updated device location comprises:

determining an initialization time associated with the second localization technique; and triggering the second localization technique during the time period in accordance with the initialization time, wherein the second localization technique is triggered such that the target localization parameter is satisfied.

6. The method of claim 5, wherein the initialization time of the second localization technique is associated with an initialization power cost, and wherein the initialization power cost is comprised in the combined maximum energy value.

7. The method of claim 1, wherein the target localization parameter is determined based on an application running on the device.

8. The method of claim 1, wherein the combination localization technique further comprises:

a third localization technique associated with a third power error time profile, and wherein the method further comprises:

determining, by the device, a revised updated device location in accordance with the third power error time profile, wherein the second localization technique is initiated during a second time period, and wherein the combined maximum energy value and the combined maximum error rate are further based on the third power error time profile and the second time period.

9. A non-transitory computer readable medium comprising computer readable code executable by one or more processors to:

determine a target localization parameter based on an operation of a device;

select a combination localization technique based on the target localization parameter, the combination localization technique comprising a first localization technique having a first power error time profile, and a second localization technique having a second power error time profile;

perform the combination localization technique using a cyclical approach to determine a location of the device, each cycle comprising:

determining, by the device, a first device location using the first localization technique for a first portion of a time period in accordance with the first power error time profile; and determining, by the device, a second device location using the second localization technique for a second portion of the time period in accordance with the second power error time profile.

10. The non-transitory computer readable medium of claim 9, wherein the first localization technique comprises a lower power intensive technique and provides a lower accuracy determination than the second localization technique over a particular time period.

11. The non-transitory computer readable medium of claim 9, wherein the target localization parameter comprises at least one selected from a group consisting of a target power cost and a target error rate for a predetermined time period.

12. The non-transitory computer readable medium of claim 9, further comprising computer readable code to:

initiate, in accordance with a triggering condition, the second localization technique; and in accordance with determining, by the device, an updated device location using the second localization technique, determine a further updated device location using the first localization technique during an additional time period following the time period based on the updated device location, wherein:

the combination localization technique is associated with a combined maximum energy value and a combined maximum error rate based on the first power error time profile and the second power error time profile, and at least one of the combined maximum energy value and the combined maximum error rate satisfies the target localization parameter.

13. The non-transitory computer readable medium of claim 12, wherein the computer readable code to determine the updated device location comprises computer readable code to:

determine an initialization time associated with the second localization technique; and trigger the second localization technique during the first time period in accordance with the initialization time, wherein the second localization technique is triggered such that the target localization parameter is satisfied.

14. The non-transitory computer readable medium of claim 13, wherein the initialization time of the second localization technique is associated with an initialization power cost, and wherein the initialization power cost is comprised in the combined maximum energy value.

15. The non-transitory computer readable medium of claim 9, wherein the target localization parameter is determined based on an application running on the device.

16. The non-transitory computer readable medium of claim 9, wherein the combination localization technique further comprises:
a third localization technique associated with a third power error time profile and wherein the non-transitory computer readable medium further comprises computer readable code to:
determine, by the device, a revised updated device location for a second time period in accordance with the third power error time profile,
wherein the second localization technique is initiated during the second time period, and
wherein the combined maximum energy value and the combined maximum error rate is further based on the third power error time profile and the second time period.

17. A system comprising:
one or more processors; and
one or more computer readable media comprising computer readable code executable by the one or more processors to:
determine a target localization parameter based on an operation of a device;
select a combination localization technique based on the target localization parameter, the combination localization technique comprising a first localization technique having a first power error time profile, and a second localization technique having a second power error time profile;
perform the combination localization technique using a cyclical approach to determine a location of the device, each cycle comprising:
determining, by the device, a first device location using the first localization technique for a first portion of a time period in accordance with the first power error time profile; and
determining, by the device, a second device location using the second localization technique for a second portion of the time period in accordance with the second power error time profile.

18. The system of claim 17, further comprising computer readable code to:
initiate, in accordance with a triggering condition, the second localization technique;
in accordance with determining, by the device, an updated device location using the second localization technique, determine a further updated device location using the first localization technique during an additional time period following the time period based on the updated device location,
wherein:
the combination localization technique is associated with a combined maximum energy value and a combined maximum error rate based on the first power error time profile and the second power error time profile, and
at least one of the combined maximum energy value and the combined maximum error rate satisfies the target localization parameter.

19. The system of claim 17, wherein the first localization technique comprises a lower power intensive technique and provides a lower accuracy determination than the second localization technique over a particular time period.

20. The system of claim 17, wherein the target localization parameter comprises at least one selected from a group consisting of a target power cost and a target error rate for a predetermined time period.

* * * * *